(12) United States Patent
Yves et al.

(10) Patent No.: US 9,499,432 B2
(45) Date of Patent: Nov. 22, 2016

(54) GLASS FIBRE COMPOSITION AND COMPOSITE MATERIAL REINFORCED THEREWITH

(71) Applicant: 3B-Fibreglass sprl, Battice (BE)

(72) Inventors: Houet Yves, Battice (BE); Laurent Dimitri, Battice (BE)

(73) Assignee: 3B-FIBREGLASS SPRL, Battice (BE)

( * ) Notice: Subject to any disclaimer, the term of this patent is extended or adjusted under 35 U.S.C. 154(b) by 0 days.

(21) Appl. No.: 14/395,207

(22) PCT Filed: Apr. 16, 2013

(86) PCT No.: PCT/EP2013/057899
§ 371 (c)(1),
(2) Date: Oct. 17, 2014

(87) PCT Pub. No.: WO2013/156477
PCT Pub. Date: Oct. 24, 2013

(65) Prior Publication Data
US 2015/0133284 A1    May 14, 2015

(30) Foreign Application Priority Data
Apr. 16, 2013 (EP) .................... 12164626

(51) Int. Cl.
*C03C 13/00* (2006.01)
*C03C 3/087* (2006.01)

(52) U.S. Cl.
CPC ............... *C03C 13/00* (2013.01); *C03C 3/087* (2013.01); *C03C 2213/00* (2013.01)

(58) Field of Classification Search
CPC .... C03C 13/00; C03C 2213/00; C03C 3/087
See application file for complete search history.

(56) References Cited

U.S. PATENT DOCUMENTS

| 8,703,633 | B2 * | 4/2014 | Tang ........................ 501/38 |
| 9,102,564 | B2 * | 8/2015 | Druart et al. | |
| 2012/0135849 | A1 * | 5/2012 | Hoffman et al. ........... 501/38 |
| 2013/0210602 | A1 * | 8/2013 | Nonaka et al. ............ 501/35 |

FOREIGN PATENT DOCUMENTS

| CN | 101597140 A | * | 12/2009 |
| EP | 2354104 A1 | | 8/2011 |
| EP | 2450321 A1 | | 5/2012 |
| WO | 2011017405 A1 | | 2/2011 |
| WO | WO 2011155362 A1 | * | 12/2011 |

* cited by examiner

*Primary Examiner* — Elizabeth A Bolden
(74) *Attorney, Agent, or Firm* — Avery N. Goldstein; Blue Filament Law PLLC

(57) ABSTRACT

The present invention concerns glass fiber composition comprising the following oxides: $SiO_2$: 57.5-59.5 wt. % $Al_2O_3$: 17.0-20.0 wt. % CaO: 11.0-13.5 wt. % MgO: 8.5-12.5 wt. % wherein the sum of $Na_2O$, $K_2O$, and $TiO_2$ is at least 0.1 wt. % and $Li_2O \leq 2.0$ wt. %, all amounts being expressed in weight % with respect to the total weight of the composition. It also concerns composite materials reinforced with such fibers, used in applications such as wind mill blades, pressure vessels, components in the automotive, machinery, aerospace applications and such products produced therewith, and wherein the temperature difference, $\Delta T$, defined as the difference between the temperature, T3, at which the composition has a viscosity of $10^3$ Poise and the liquidus temperature, $T_{liq}$, is at least 50° C.

19 Claims, 3 Drawing Sheets

US 9,499,432 B2

GLASS FIBRE COMPOSITION AND COMPOSITE MATERIAL REINFORCED THEREWITH

FIELD OF THE INVENTION

The present invention relates to the field of glass fibres, in particular of compositions of glass fibres suitable as reinforcement of high performance fibre reinforced organic or inorganic matrix composite materials. It finally relates to products, such as windmill blades comprising a polymeric shell or skin reinforced with the above glass fibres.

BACKGROUND OF THE INVENTION

Glass fibre compositions suitable as reinforcement for composite materials have been described for a long time. In 1966, FR1435073 disclosed a composition for a so-called R-glass fibre comprising 50 to 65 wt % $SiO_2$, 20 to 30 wt % $Al_2O_3$, 5 to 20 wt % MgO, and 6 to 16 wt % CaO. These fibres with higher mechanical strength than the more commonly known E-glasses are, however, hindered by rather severe processing conditions, in particular high processing temperatures and more problematic fiberization, which all contribute to their higher cost compared with E-glass.

E-glass is probably the most common type of glass used in continuous fibre reinforced composites. E-glass is defined in ASTM-D-57 8-00 as a glass comprising 52 to 62 wt % $SiO_2$, 12 to 16 wt % $Al_2O_3$, 0 to 5 wt % MgO, 16 to 25 wt % CaO, and 0 to 10 wt % $B_2O_3$. E-glass is usually used as the reference fibre with which the performance of new glass compositions is compared. Boron free E-glass compositions have been proposed, e.g., in U.S. Pat. No. 5,789,329 with 59 to 62 wt % $SiO_2$, 12 to 15 wt % $Al_2O_3$, 1 to 4 wt % MgO, 20 to 24 wt % CaO, and minor amounts of alkaline oxides like $Na_2O$ and $K_2O$.

S-glass is a glass generally having higher mechanical strength than E-glasses and comprising about 65 wt % $SiO_2$, 25 wt % $Al_2O_3$, and 10 wt % MgO.

A multitude of quaternary glass fibre compositions comprising $SiO_2$, $Al_2O_3$, CaO, and MgO as major components, within and around the three main R-, E-, S-glass types revised supra have been proposed in the literature.

GB520246 filed in 1938 discloses a quaternary fibre composition comprising either boron or fluorine in rather high amounts, not admissible nowadays. It also discloses a couple of boron and fluorine free compositions which distinguish themselves from the boron and fluorine containing compositions in a substantially higher amounts of $Al_2O_3$. These fibres are not suitable for reinforcement in composite materials as they are designed for use as insulation sheath for electrical cables.

In EP1496026 a glass fibre composition is disclosed comprising substantially less boron than traditional E-glass and yet having a considerably lower viscosity than boron free E-glass formulations, thus reducing batch costs. The glass fibres disclosed in this document comprise, 52-62 wt % $SiO_2$, 10-15 wt % $Al_2O_3$, 18-25 wt % CaO, 0.5-4 wt % MgO, and 3.5-5.5 wt % $B_2O_3$.

In GB1391384 a glass fibre composition is disclosed comprising no boron and showing acceptable viscosity and liquidus temperature. The glass fibres disclosed in this document comprise, 54-64 wt % $SiO_2$, 9-19 wt % $Al_2O_3$, 9-25 wt % CaO, 0-10 wt % MgO, and various oxides in amounts less than 6 wt %.

WO2007/055964 and WO2007/055968 propose glass compositions yielding fibres with higher mechanical properties and enhanced resistance to temperature and acids than E-glasses with good forming capability. They are characterized by a content of 60.5-70.5 wt % $SiO_2$, 10-24.5 wt % $Al_2O_3$, and 6-20 wt % of RO (=MgO+CaO+SrO). The glass fibres cited in the examples comprise 4.8-14 wt % CaO, and 5.0-11.3 wt % MgO.

EP1641717 discloses glass fibres with mechanical properties comparable with the ones of R-glass, as disclosed in FR1435073, and yielding enhanced processing properties, in particular, melting and fiberization conditions. The glass fibres proposed in EP1641717 comprise 50-65 wt % $SiO_2$, 12-20 wt % $Al_2O_3$, 12-17 wt % CaO, and 6-12 wt % MgO, with a combined amount of (MgO+$Al_2O_3$) preferably larger than 24 wt %.

WO2009/138661 teaches that a glass fibre having a high modulus and a liquidus temperature of 1250° C. or less can be obtained with a formulation comprising 50-65 wt % $SiO_2$, 12-23 wt % $Al_2O_3$, 1-10 wt % CaO, and 6-12 wt % MgO. The sum of $SiO_2$ and $Al_2O_3$ should be greater than 79 wt %.

WO9840321 describes a glass fibre suitable for heat and sound insulation in the building industry comprising 50-60 wt % $SiO_2$, 1-6 wt % $Al_2O_3$, 16-22 wt % MgO, and 12-18 wt % CaO. The use of this glass as reinforcement for composite materials is not disclosed.

CA1045641 and U.S. Pat. No. 3,892,581 disclose glass fibres for composites reinforcement comprising 53-57.3 wt % $SiO_2$, 16.3-18.5 wt % $Al_2O_3$, 8.5-12.7 wt % CaO, and 6.6-10.5 wt % MgO. Similarly, WO2006/064164 describes glass fibres for reinforcement of composite materials with a higher content of $Al_2O_3$ and CaO than the preceding compositions, and comprising 50.0-65.0 wt % $SiO_2$, 12.0-20.0 wt % $Al_2O_3$, 12.0-17.0 wt % CaO, and 6.0-12.0 wt % MgO.

WO2008/142347 discloses low cost glass fibre formulations providing excellent trade-off between mechanical properties and production conditions. They comprise rather low combined amounts of (MgO+$Al_2O_3$), with 62.0-72.0 wt % $SiO_2$, 4.0-11.0 wt % $Al_2O_3$, 8.0-22.0 wt % CaO, and 1.0-7.0 wt % MgO.

WO2011095601, WO2011095598, and WO2011095597 disclose glass fibre compositions having high MgO and CaO amounts, for relatively high MgO/$Al_2O_3$ ratios, yielding excellent mechanical properties.

WO2011017405 discloses a number of glass fibre compositions having a relatively high content of $SiO_2$. The few examples containing not more than 59.5 wt. % $SiO_2$ generally yield unacceptably low values of $\Delta T$, with several having even negative values of $\Delta T$ (cf. Ex. 35, 42, 47, and 48 of WO2011017405, and annexed FIG. 4).

EP2450321 was filed before, but published after the priority date claimed by the present invention and discloses a number of glass fibre compositions which are close to, albeit different from the ones called for in the present invention.

EP2354104 discloses compositions with pure major oxides ($SiO_2$, $Al_2O_3$, CaO, MgO) and no minor oxides, which yield acceptable properties but at a higher cost.

In spite of the extensive research done to date to develop glass fibre compositions with enhanced properties, there still is a need to find glass fibres combining high mechanical, physical and chemical properties with, in particular, production cost effectiveness.

SUMMARY OF THE INVENTION

The present invention is defined in the appended independent claims. Preferred embodiments are defined in the dependent claims. The present invention provides a glass fibre composition comprising the following oxides;
SiO$_2$: 57.5-59.5 wt. %
Al$_2$O$_3$: 17.0-20.0 wt. %
CaO: 11.0-13.5 wt. %
MgO: 8.5-12.5 wt. %
wherein the sum of Na$_2$O, K$_2$O, and TiO$_2$ is at least 0.1 wt. % and Li$_2$O≤2.0 wt. %, all amounts being expressed in weight % with respect to the total weight of the composition and wherein the temperature difference, ΔT, defined as the difference between the temperature, T3, at which the composition has a viscosity of 10$^3$ Poise and the liquidus temperature, T$_{liq}$, is equal to at least 50° C. In particular, the liquidus temperature, T$_{liq}$, of the glass fibre composition according to the present invention is preferably not more than 1233° C., more preferably not more than 1228° C., most preferably not more than 1225° C. The T3-temperature on the other hand, is preferably not more than 1306° C., more preferably not more than 1300° C., more preferably not more than 1296° C. A lower value of T3 is of course more economical as it allows the whole glass fibre manufacturing process to run at lower temperatures.

Li$_2$O is a well-known fluxing agent for glass compositions, allowing the decrease of the T3 value, without affecting substantially the liquidus temperature, but its high price is detrimental to the overall cost efficacy of a glass composition comprising substantial amounts of Li$_2$O. Thermal properties must therefore be regulated by other means than extensive use of Li$_2$O, as afforded by the present compositions. Preferably, the composition comprise not more than 1.0 wt. % Li$_2$O, more preferably, not more than 0.5 wt. %, most preferably, it comprises not more than traces of Li$_2$O.

The composition preferably comprises:
at least 0.2 wt. %, preferably at least 0.3 wt. % of Na$_2$O, and/or
at least 0.2 wt. %, preferably at least 0.3 wt. % of K$_2$O, and/or
not more than 1.0 wt. % TiO$_2$.

The glass fibre compositions of the present invention may comprise other oxides such as:
at least 0.1 wt. %, preferably at least 0.2 wt. % Fe$_2$O$_3$, and/or
at least 0.1 wt. % B$_2$O$_3$, preferably between 0.15 to 3.0 wt. % B$_2$O$_3$.

In a preferred embodiment, the fibre composition comprises:
SiO$_2$: 57.5-59.0 wt. %, preferably 57.5-58.5 wt. %
Al$_2$O$_3$: 17.0-19.5 wt. %, preferably 17.5-19.0 wt. %
CaO: 11.0-13.0 wt. %, preferably 11.5-13.0 wt. %
MgO: 9.0-12.0 wt. %, preferably 9.5-11.5 wt. %.

It is preferred to limit the sum SiO$_2$+Al$_2$O$_3$, i.e., the network forming oxides of glass, to not more than 78.0 wt. %, preferably not more than 76.0 wt. %. It is also preferred to use at least 21.5 wt. %, preferably at least 22.5 wt. %, more preferably not more than 24.5 wt. % of CaO and MgO in combination. The sum MgO+CaO and MgO+Al$_2$O$_3$ are actually preferably restricted to:
20.0≤MgO+CaO≤26.0 wt %, preferably 22.0≤MgO+CaO≤25.0 wt %, and
25.5≤MgO+Al$_2$O$_3$<33.0 wt %, preferably 26.0≤MgO+Al$_2$O$_3$<32.0 wt %

The ratio between the content of MgO to Al$_2$O$_3$ is preferably at least 0.52, more preferably not more than 0.75, and most preferably not more than 0.65. The MgO/CaO ratio, on the other hand, is preferably comprised between 0.7 and 1.3 more preferably between 0.75 and 1.2, most preferably between 0.8 and 1.1.

The sum of Na$_2$O and K$_2$O is preferably at least 0.1 wt. %, more preferably at least 0.2 wt. %, most preferably at least 0.5 wt. %, and even at least 0.9 wt. %. The SiO$_2$ to MgO amounts is preferably defined as SiO$_2$<0.8 MgO+51.4 wt. %.

Glass fibres according to the present invention are suitable as reinforcement for composite materials, in particular in applications such as wind mill blades, marine, automotive, and aerospace applications and the like. They are preferably used as reinforcement in the form of continuous, or at least long fibres.

DETAILED DESCRIPTION OF THE INVENTION

The glass fibre compositions of the present invention are defined as quaternary because they comprise at least 5 wt % of the following four components: SiO$_2$, Al$_2$O$_3$, CaO, and MgO. In particular, said components are present in the compositions of the present invention in the following amounts:
SiO$_2$: 57.5-59.5 wt. %
Al$_2$O$_3$: 17.0-20.0 wt. %
CaO: 11.0-13.5 wt. %
MgO: 8.5-12.5 wt. %

In a preferred embodiment, the four major oxides are present in the following amounts:
SiO$_2$: 57.5-59.0 wt. %, preferably 57.5-58.5 wt. %
Al$_2$O$_3$: 17.0-19.5 wt. %, preferably 17.5-19.0 wt. %
CaO: 11.0-13.0 wt. %, preferably 11.5-13.0 wt. %
MgO: 9.0-12.0 wt. %, preferably 9.5-11.5 wt. %

Figure 1:
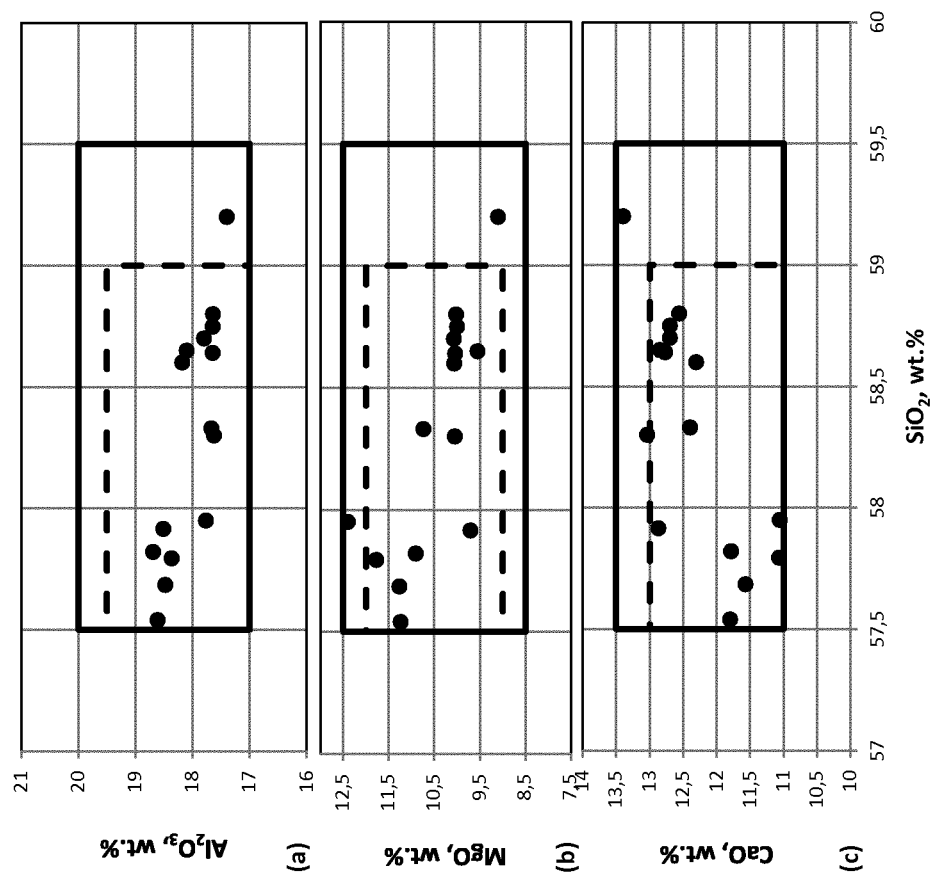
FIG. 1: shows a plot of the SiO$_2$ content vs contents of (a) Al$_2$O$_3$, (b) MgO, and (c) CaO (solid line=claim 1).

FIG. 1 illustrates graphically the concentration windows of Al$_2$O$_3$, CaO, and MgO as a function of SiO$_2$. The solid line rectangles define the concentration boundaries of the present invention. The dashed line rectangles define the preferred concentration windows. The black circles are glass compositions according to the present invention as listed in Table 1. In order to fall within the present invention, One composition must fall within the thick line rectangle in all three graphs (a)-(c) of FIG. 1. The compositions according to the present invention must, however, comprise also other oxides in amounts lower than SiO$_2$, Al$_2$O$_3$, CaO, and MgO.

In order to control the properties, in particular the thermal properties of the glass, the glass compositions comprise at least one or a combination of Na$_2$O, K$_2$O, and TiO$_2$ in a combined amount of at least 0.1 wt. %. Na$_2$O is preferably, present in the composition In an amount of at least 0.2 wt. %, more preferably of at least 0.3 wt. %. The composition preferably comprises at least 0.2 wt. %, more preferably at least 0.3 wt. % of K$_2$O, and TiO$_2$ is preferably present in the composition in not more than 1.0 wt. %. The combined amount of Na$_2$O and K$_2$O is preferably at least 0.1 wt. %, preferably at least 0.2 wt. %, more preferably at least 0.5 wt. %, most preferably at least 0.9 wt. %. The presence of minor oxides has a double benefit. First, it allows the fine tuning of various properties such as in particular the thermal properties (e.g., liquidus temperature and T3). Second; it permits to use raw materials of lower purity and of various origins. Li$_2$O, on the other hand, if present at all, must not be present in more than 2.0 wt. %. Its cost is very high, and likely to remain so, and its use in substantial amounts, though beneficial to the thermal properties as it may be, increases the cost of production too much. In spite of the minimal amounts of Li$_2$O used herein, the compositions of the present invention show good thermal properties.

Figure 2:
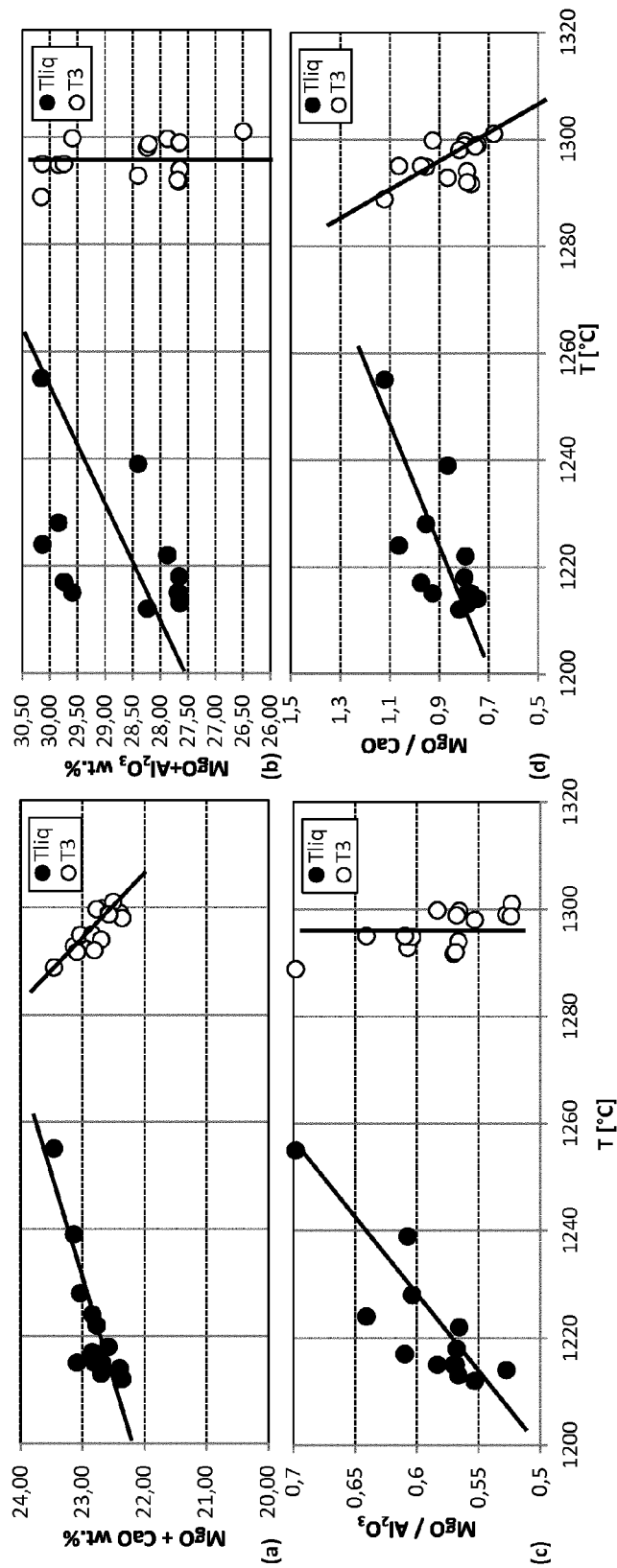
FIG. 2: shows a plot of the liquidus temperature (black circles) and T3 (white circle) vs (a) MgO+CaO, (b) MgO+Al$_2$O$_3$, (c) MgO/Al$_2$O$_3$, and (d) MgO/CaO.

FIG. 2 shows graphically the evolution of the liquidus temperature and T3 as a function of (a) MgO+CaO, (b) MgO+Al$_2$O$_3$, (c) MgO/Al$_2$O$_3$, and (d) MgO/CaO. It can be seen that T3 is substantially independent of MgO+Al$_2$O$_3$ and MgO/Al$_2$O$_3$ (substantially vertical lines) but increases substantially when the amount of MgO+CaO decreases and, to a minor extent, when the ratio MgO/CaO decreases. For these reasons, it is preferred to use at least 21.5 wt. %, of MgO+CaO, preferably at least 22.5 wt. %, and more preferably not more than 24.5 wt. %. On the other hand, the liquidus temperature is substantially proportional to each of MgO+CaO, MgO+Al$_2$O$_3$, and MgO/Al$_2$O$_3$. A temperature difference, $\Delta T=T3-T_{liq}$, of at least 50° C. is preferred to allow for a manageable processing window of the glass fibres. As can be seen in FIG. 2(a), the value of $\Delta T$ (distance between a black circle and corresponding white circle on the same ordinate) varies with the value of MgO+CaO. Here again, too high a value of MgO+CaO is not desired, and it is preferred that it is not greater than 24.0 Wt. %, more preferably not greater than 23.5 wt. %. Similarly it can be seen in FIGS. 2(b)&(c) that the value of $\Delta T$ decreases with increasing values of MgO+Al$_2$O$_3$, and MgO/Al$_2$O$_3$. It is therefore preferred that the value of MgO+Al$_2$O$_3$ be at least 25.5 wt. %, more preferably at least 26.0 wt. %, most preferably at least 27.0 wt. % and it should preferably be not more than 33.0 wt. %, more preferably not more than 32.0 wt. %, most preferably not more than 31.0 wt. %. The ratio MgO/Al$_2$O$_3$ is preferably at least 0.52 and preferably not more than 0.75, more preferably not more than 0.65. Contrary to most glass fibre compositions on the market, the content of MgO in the present invention is preferably quite similar to the content of CaO, with MgO/CaO ratios close to unity, in particular between 0.7 and 1.3 more preferably between 0.75 and 1.2, most preferably between 0.8 and 1.1.

Figure 3:
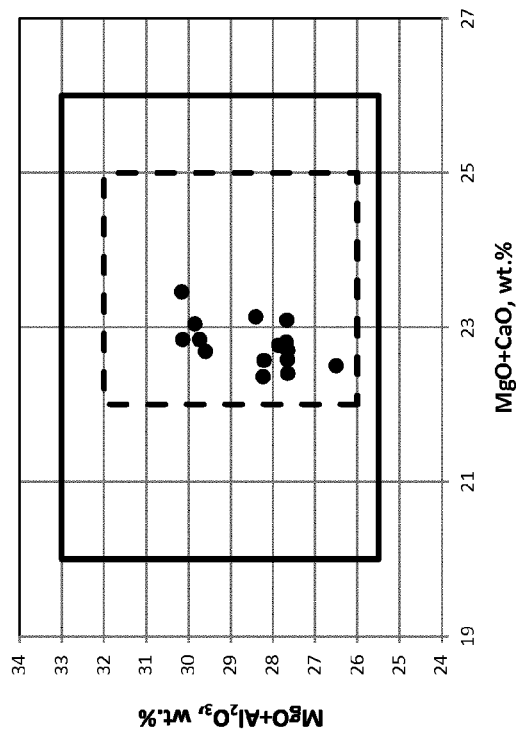
FIG. 3: shows a plot of MgO+CaO vs MgO+Al$_2$O$_3$.

FIG. 3 illustrates graphically preferred ranges of MgO+CaO and MgO+Al$_2$O$_3$ including the experimental data of Table 1 (cf. black circles).

Other oxides can be used in the present composition, such as at least 0.1 wt. %, preferably at least 0.2 wt. % Fe$_2$O$_3$, and/or at least 0.1 wt. % B$_2$O$_3$, preferably between 0.15 to 3.0 wt. % B$_2$O$_3$. Other examples of oxides that may enter into the composition of the present fibres are any oxide of the following elements: Li, Zn, Mn, Ce, V, Ti, Be, Sn, Ba, Zr, Sr, which may be present in an amount less than 5 wt %, typically of 0.05 to 3 wt %, preferably from 0.2 to 1.5, or 0.5 to 1.0 wt %.

Figure 4:
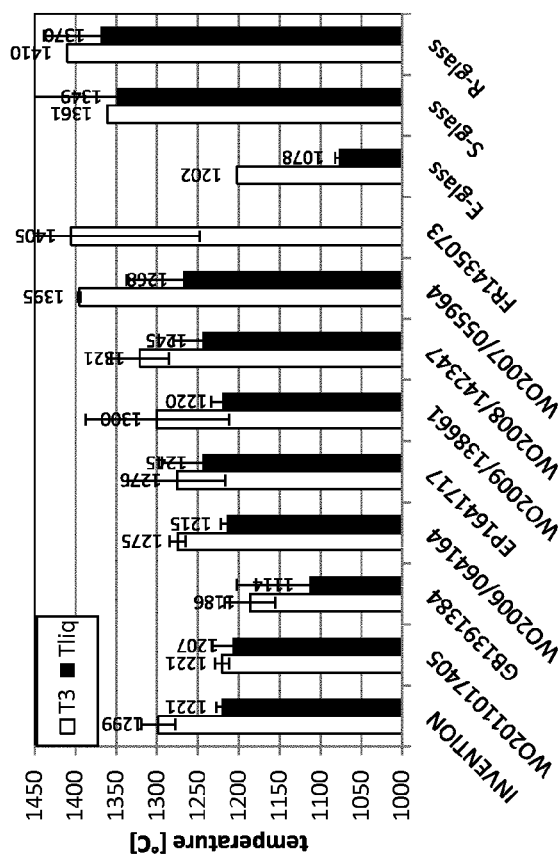
FIG. 4: shows a plot of the liquidus temperature and T3 for different types of glasses.

Table 1 lists the compositions of a number of glass fibres according to the present invention and represented in FIG. 1 with black circles. Table 1 also lists the measured values of the liquidus temperature, T3, and $\Delta T$, represented in FIG. 2. FIG. 4 compares the mean values of the liquidus temperature and T3 of the glass fibres according to the present invention and listed in Table 1, with the ones of some relevant prior art, including mean values for E-, R-, and S-glasses, and showing the relatively low thermal properties of the present compositions, with liquidus temperatures and T3 much lower than S-glasses and R-glasses. In view of the large number of examples in WO2011017405, only the compositions comprising not more than 59.5 wt. % as called for in present claim 1 were selected, yielding very low $\Delta T$-values, with many negative values, which are, of course, unacceptable for glass fibre manufacturing.

The compositions listed in Table 1 yield a combination of good elastic moduli of the order of 87±2 GPa (ca 33.5 MPa/kg/m$^3$) with cost effective processing temperatures with a mean T3 value of less than 1300° C., a mean liquidus temperature of the order of 1221° C., and with a mean value of $\Delta T$ of about 78° C.

Contrary to the conservative trend observed in the prior art, a totally novel and unexplored area of glass fibre formulations characterized by a substantially higher amount of MgO and CaO compared with Al$_2$O$_3$ and SiO$_2$ and low amounts of SiO$_2$ has shown to yield excellent thermal properties with good mechanical properties. The effect of a given oxide cannot be isolated and it strongly depends on the amounts of other oxides in ways not yet fully understood. The present invention has highlighted some trends of some oxides on the thermal properties of the glass compositions, which are essential for the cost effectiveness of the glass fibres thus produced.

TABLE 1

Glass formulations according to the present invention (cf. black circles in FIGS. 1&2)

| | SiO$_2$ wt. % | Al$_2$O$_3$ wt. % | CaO wt. % | MgO wt. % | Na$_2$O wt. % | K$_2$O wt. % | TiO$_2$ wt. % | Fe$_2$O$_3$ wt. % | SrO wt. % | Li$_2$O wt. % | T3 [° C.] | T$_{liq}$ [° C.] | $\Delta T$ [° C.] |
|---|---|---|---|---|---|---|---|---|---|---|---|---|---|
| Ex1 | 57.82 | 18.69 | 11.78 | 10.91 | 0.27 | 0.07 | 0.13 | 0.22 | 0.11 | 0.00 | 1300 | 1215 | 85 |
| Ex2 | 57.79 | 18.37 | 11.07 | 11.77 | 0.36 | 0.10 | 0.12 | 0.26 | 0.16 | 0.00 | 1295 | 1224 | 71 |
| Ex3 | 57.54 | 18.61 | 11.80 | 11.24 | 0.29 | 0.08 | 0.14 | 0.24 | 0.06 | 0.00 | 1295 | 1228 | 67 |
| Ex4 | 58.70 | 17.80 | 12.70 | 10.07 | 0.27 | 0.08 | 0.11 | 0.18 | 0.09 | 0.00 | 1300 | 1222 | 78 |
| Ex5 | 58.80 | 17.64 | 12.56 | 10.02 | 0.34 | 0.07 | 0.16 | 0.26 | 0.15 | 0.00 | 1299 | 1218 | 81 |
| Ex6 | 58.30 | 17.62 | 13.04 | 10.05 | 0.33 | 0.07 | 0.17 | 0.24 | 0.18 | 0.00 | 1292 | 1215 | 77 |
| Ex7 | 57.69 | 18.47 | 11.57 | 11.27 | 0.35 | 0.08 | 0.13 | 0.25 | 0.19 | 0.00 | 1295 | 1217 | 78 |
| Ex8 | 58.75 | 17.65 | 12.70 | 10.00 | 0.33 | 0.07 | 0.01 | 0.24 | 0.25 | 0.00 | 1294 | 1213 | 81 |
| Ex9 | 58.64 | 17.65 | 12.77 | 10.04 | 0.32 | 0.08 | 0.01 | 0.25 | 0.24 | 0.00 | 1292 | 1215 | 77 |
| Ex10 | 58.65 | 18.10 | 12.85 | 9.55 | 0.33 | 0.09 | 0.01 | 0.25 | 0.17 | 0.00 | 1299 | 1214 | 85 |
| Ex11 | 58.60 | 18.18 | 12.30 | 10.06 | 0.35 | 0.09 | 0.01 | 0.25 | 0.16 | 0.00 | 1298 | 1212 | 86 |
| Ex12 | 59.20 | 17.40 | 13.40 | 9.10 | 0.35 | 0.09 | 0.01 | 0.25 | 0.20 | 0.00 | 1306 | 1228 | 78 |
| Ex13 | 59.70 | 17.10 | 13.00 | 9.30 | 0.35 | 0.09 | 0.01 | 0.25 | 0.20 | 0.00 | 1309 | 1223 | 86 |
| Ex14 | 59.70 | 17.10 | 11.20 | 11.10 | 0.35 | 0.09 | 0.01 | 0.25 | 0.20 | 1.00 | 1307 | 1233 | 74 |
| Ex15 | 57.89 | 18.50 | 12.85 | 9.68 | 0.04 | 0.38 | 0.33 | 0.22 | 0.11 | 0.00 | 1298 | 1231 | 67 |
| mean | | | | | | | | | | | 1299 | 1221 | 78 |

The SiO$_2$ content in the compositions of the present invention is relatively low compared with most glass fibre compositions, and the MgO content on the other hand is relatively high. It is preferred that the amount of SiO$_2$ be related to the amount of MgO as: SiO$_2$<0.8 MgO+51.4 wt. %.

The glass fibres of the present invention are particularly suitable for use as reinforcement in composite materials with an organic or inorganic matrix. The reinforcement fibres can be present as continuous yarns or short fibres. They are preferably used as continuous yarns in so called advanced composite materials. These can be used as unidirectional filaments, like in filament winding, particularly suitable for the production of pressure vessels, or can be woven, braided, or knitted to form a series of 2-D or 3-D reinforcement preforms well known to the persons skilled in the art.

The composite materials produced with the glass fibres of the present invention may have an inorganic matrix, but composite materials with an organic matrix are particularly preferred. In particular, the fibres of the present invention may be used with thermoset resins, thermoplastic polymers, or elastomers alike. In the case of thermoset resins, the fibres may be impregnated in the composite forming tool (e.g., RTM, sheet moulding, or filament winding) or pre-impregnated forming a prepreg or a tow-preg. For thermoplastic polymers, direct impregnation of dry fibres is probleamtic because of the generally high viscosity of thermoplastic melts, and a solvent is then required to lower the viscosity. But solvent extraction after formation is time and energy consuming and raises serious environmental concerns. It is preferred to produce tow-pregs wherein the glass fibres are intimately mingled with the thermoplastic matrix present either as a powder or as filaments. As is the case with glass-thermoset prepregs, the glass-thermoplastic towpregs are impregnated and consolidated in a tool under elevated temperature and pressure. Unlike the thermoset composites, the thermoplastic matrix must be cooled below its melting temperature prior to extracting the composite part from the tool.

Composite materials reinforced with the fibres of the present invention can advantageously be used for the manufacturing of a number of advanced engineering parts, such as panels in the automotive and aerospace industries, pressure vessels, and windmill blades.

Panels or more intricate functional parts in e.g., the automotive and aerospace industries may be produced by any processing technique known in the art, such as resin transfer moulding (RTM), compression moulding, vacuum bagging, autoclave forming, filament winding, etc. Pressure vessels can advantageously be produced by filament winding. Alternatively, they can be produced by laying the fibres, e.g., as a braided or knitted preform on an inflatable bladder and the whole system is then placed into a closed tool defining a cavity. Resin is either injected if the fibres are dry, or in case of prepregs or tow-pregs, the temperature is raised and the bladder inflated to press the fibres and matrix against the inner walls of the tool defining the cavity to drive impregnation of the fibres.

Windmill blades may be produced by winding roving tapes or roving bundles around a core or mandrel, as disclosed e.g., in U.S. Pat. No. 4,242,160 and U.S. Pat. No. 4,381,960. They can also be manufactured by joining two half-shells produced e.g., by compression moulding, vacuum bagging, autoclave forming, or stamping prepregs. The joining is generally carried out with an adhesive which is critical and may constitute a weak part of the blade. Depending on the matrix, resin curing may advantageously be carried out by exposure to UV radiation or heat. In case of thermoplastic polymers, the temperature cycle includes heating above and cooling below the melting temperature prior, respectively, after the fibre impregnation stage. Windmill blades may also be produced by RTM, the blades comprising a foam core or the tool being designed with a removable core (cf. e.g., US2003116262).

The invention claimed is:

1. A glass fibre composition comprising the following oxides;
   SiO$_2$: 57.5-59.5 wt. %
   Al$_2$O$_3$ 17.0-20.0 wt. %
   CaO: 11.5-13.5 wt. %
   MgO: 8.5-12.5 wt. %
   wherein a sum of Na$_2$O, K$_2$O, and TiO$_2$ is at least 0.1 wt. % and Li$_2$O<2.0 wt. %, all amounts being expressed in weight % with respect to the total weight of the composition, and wherein the temperature difference, ΔT, defined as the difference between the temperature, T3, at which the composition has a viscosity of 10$^3$ Poise and the liquidus temperature, T$_{liq}$, is at least 50° C., and wherein the liquidus temperature, T$_{liq}$, of not more than 1233° C.

2. The glass fibre composition according to claim 1, comprising:
   SiO$_2$: 57.5-59.0 wt. %,
   Al$_2$O$_3$: 17.0-19.5 wt. %,
   CaO: 11.5-13.0 wt. %,
   MgO: 9.0-12.0 wt. %.

3. The glass fibre composition according to claim 1, comprising:
   SiO$_2$: 57.5-58.5 wt. %
   Al$_2$O$_3$: 17.5-19.0 wt. %
   CaO: 11.5-13.0 wt. %
   MgO: 9.5-11.5 wt. %.

4. The glass fibre composition according to claim 1, further comprising:
   at least 0.2 wt. % of Na$_2$O, and/or
   at least 0.2 wt. % of K$_2$O, and/or
   at least 0.1 wt. % of Fe$_2$O$_3$, and/or
   at least 0.1 wt. % B$_2$O$_3$, and/or
   not more than 1.0 wt. % TiO$_2$.

5. The glass fibre composition according to claim 1, wherein the sum CaO+MgO is at least 21.5 wt. %.

6. The glass fibre composition according to claim 1, wherein a MgO/CaO ratio is comprised between 0.7 and 1.3.

7. The glass fibre composition according to claim 1, wherein a ratio MgO/Al$_2$O$_3$ is at least 0.52.

8. The glass fibre composition according to claim 1, wherein a sum of Na$_2$O and K$_2$O is at least 0.1 wt. %.

9. The glass fibre composition according to claim 1, wherein the amount of SiO$_2$<0.8 MgO+51.4 wt. %.

10. The glass fibre composition according to claim 1, wherein a sum of the SiO$_2$ and the Al$_2$O$_3$ is not more than 78 wt. %.

11. The glass fibre composition according to claim 10, wherein the sum of the SiO$_2$ and the Al$_2$O$_3$ is not more than 76.0 wt. %.

12. The glass fibre composition according to claim 1, characterized by:
   20.0<MgO+CaO<26.0 wt. %, and
   25.5<MgO+Al$_2$O$_3$<33.0 wt. %.

13. The glass fibre composition according to claim 12, characterized by:
   22.0<MgO+CaO<25.0 wt %, and
   26.0<MgO+Al$_2$O$_3$<32.0 wt %.

14. The glass fibre composition according to claim 12, wherein the sum CaO+MgO is at least 22.5 wt. %.

15. The glass fibre composition according to claim 1, having a liquidus temperature, $T_{liq}$, of not more than 1228° C.

16. The glass fibre composition according to claim 1, having the liquidus temperature, $T_{liq}$, of not more than 1225° C.

17. The glass fibre composition according to claim 1, having a T3-temperature of not more than 1306° C.

18. The glass fibre composition according to claim 1, having a T3-temperature of not more than 1300° C.

19. The glass fibre composition according to claim 1, having a T3-temperature of not more than 1296° C.

* * * * *